(12) United States Patent
Scannapieco (10) Patent No.: US 12,524,743 B2
(45) Date of Patent: Jan. 13, 2026

(54) MAINTENANCE MANAGEMENT SOFTWARE AND METHODS OF PERFORMING THE SAME

(71) Applicant: Steven Scannapieco, Lynchburg, VA (US)

(72) Inventor: Steven Scannapieco, Lynchburg, VA (US)

( * ) Notice: Subject to any disclaimer, the term of this patent is extended or adjusted under 35 U.S.C. 154(b) by 12 days.

(21) Appl. No.: 18/647,638

(22) Filed: Apr. 26, 2024

(65) Prior Publication Data

US 2025/0335879 A1 Oct. 30, 2025

Related U.S. Application Data

(60) Provisional application No. 63/638,081, filed on Apr. 24, 2024.

(51) Int. Cl.
*G06Q 10/20* (2023.01)
*G06Q 10/0631* (2023.01)
*G06Q 10/1093* (2023.01)
*G06Q 30/0273* (2023.01)
*G06Q 30/0283* (2023.01)

(52) U.S. Cl.
CPC ....... *G06Q 10/20* (2013.01); *G06Q 10/06316* (2013.01); *G06Q 10/1093* (2013.01); *G06Q 30/0275* (2013.01); *G06Q 30/0283* (2013.01)

(58) Field of Classification Search
CPC ............ G06Q 10/20; G06Q 10/06316; G06Q 10/1093; G06Q 30/0275; G06Q 30/0283
See application file for complete search history.

(56) References Cited

U.S. PATENT DOCUMENTS

| | | | |
|---|---|---|---|
| 2006/0282364 A1* | 12/2006 | Berg | G06Q 40/04 705/37 |
| 2010/0325582 A1* | 12/2010 | Bansal | G06Q 10/20 715/810 |
| 2020/0210963 A1* | 7/2020 | Parash | G06Q 10/0633 |
| 2020/0210964 A1* | 7/2020 | Monovich | G06Q 10/063114 |
| 2022/0366485 A1* | 11/2022 | Saeman | G06Q 10/20 |
| 2024/0127144 A1* | 4/2024 | St. Pierre | G06Q 10/063112 |
| 2024/0202670 A1* | 6/2024 | Phan | G06Q 10/20 |
| 2024/0220895 A1* | 7/2024 | St Pierre | G06V 20/52 |
| 2024/0249371 A1* | 7/2024 | Brockhurst | G06Q 10/06316 |
| 2024/0264589 A1* | 8/2024 | Cheng | G06Q 10/20 |
| 2024/0273479 A1* | 8/2024 | Teeple | G06F 3/14 |
| 2024/0338662 A1* | 10/2024 | Durand | G06Q 10/20 |
| 2024/0403895 A1* | 12/2024 | Menon | G06Q 50/02 |

FOREIGN PATENT DOCUMENTS

JP 2014093089 A * 5/2014 ............. G06Q 10/10

* cited by examiner

*Primary Examiner* — Alexander Khong
(74) *Attorney, Agent, or Firm* — IP Works Law PLLC (57) ABSTRACT

A maintenance management system including a first database operating on a server a second database operating on a remote device in communication with the second database, a scheduling unit for scheduling maintenance, a task unit for listing tasks to perform for maintenance on at least one piece of equipment, where the scheduling and tasks are stored in the first database and the second database.

14 Claims, 7 Drawing Sheets

MAINTENANCE MANAGEMENT SOFTWARE AND METHODS OF PERFORMING THE SAME

CROSS REFERENCE TO PRIOR APPLICATIONS

This is application claims the benefit of and priority from U.S. Application Ser. No. 63/638,081, filed Apr. 24, 2024 which is fully incorporated herein by reference.

BACKGROUND OF THE INVENTION

As monitoring systems become more and more advanced and incorporate electronics and complex sensors, the maintenance required to ensure the accuracy of equipment also increases. Because of the complexity of monitoring systems, an industry that provides calibration and maintenance services for equipment has grown. Problems arise in the maintenance of equipment due to the large variety of monitors and the large number of manufacturers because technicians are tasked with obtaining knowledge of a large number of systems. Further, scheduling and confirming maintenance has been performed on monitors causes additional logistics issues.

A need exists for a system that can schedule equipment maintenance and provide knowledge to technicians performing maintenance.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment of the present disclosure includes a maintenance management system having a first database operating on a server, a second database operating on a remote device in communication with the second database, a scheduling unit for scheduling maintenance, a task unit for listing tasks to perform for maintenance on at least one piece of equipment, where the scheduling and tasks are stored in the first database and the second database.

In another embodiment, historical information on at least one device is stored in the first database.

In another embodiment, the remote device requests historical information from the first database to resolve an issue with a piece of equipment.

In another embodiment, the historical information is gathered from more than one facility connected to the first database.

In another embodiment, the remote device distributes a description of an issue with at least one piece of equipment to at least one vendor.

In another embodiment, the at least one vendor provides an estimate to repair the issue with the at least one piece of equipment.

In another embodiment, the remote device schedules the vendor submitting the lowest price to repair the issue with the at least one piece of equipment.

In another embodiment, the remote device monitors the repair of the at least one piece of equipment by monitoring the status of the equipment.

In another embodiment, the at least one piece of equipment is a monitoring device.

In another embodiment, the at least one piece of equipment is associated with a facility.

Another embodiment of the present disclosure includes a method of tracking maintenance on at least one piece of equipment, the method including the step of operating a first database on a server, operating a second database on a remote device with the remote device in communication with the second database, scheduling maintenance via scheduling unit, listing tasks to perform for maintenance on at least one piece of equipment, where the scheduling and tasks are stored in the first database and the second database.

Another embodiment includes the step of storing historical information on at least one device in the first database.

Another embodiment includes the step of requesting historical information via the remote device from the first database to resolve an issue with a piece of equipment.

Another embodiment includes the step of gathering the historical information from more than one facility connected to the first database.

Another embodiment includes the step of distributing a description of an issue with at least one piece of equipment to at least one vendor.

In another embodiment, the at least one vendor provides an estimate to repair the issue with the at least one piece of equipment.

Another embodiment includes the step of scheduling the vendor submitting the lowest price to repair the issue with the at least one piece of equipment.

Another embodiment includes the step of monitoring the repair of the at least one piece of equipment by monitoring the status of the equipment.

In another embodiment, the at least one piece of equipment is a monitoring device.

In another embodiment, the at least one piece of equipment is associated with a facility.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Referring now to the drawings which depict different embodiments consistent with the present invention, wherever possible, the same reference numbers will be used throughout the drawings and the following description to refer to the same or like parts.

The maintenance management system monitors maintenance activities for various pieces of equipment physically located at different facilities. The maintenance management system tracks scheduled maintenance and allows technicians using the system to gather information on solutions to problems solved for various issues that arise in performing maintenance. Technicians using the system are given a checklist that lists the tasks to perform in completing scheduled maintenance on a specific piece of equipment. The software gathers information on measured characteristics during maintenance and compares these values to benchmarks related to the operation of the equipment.

Figure 1:
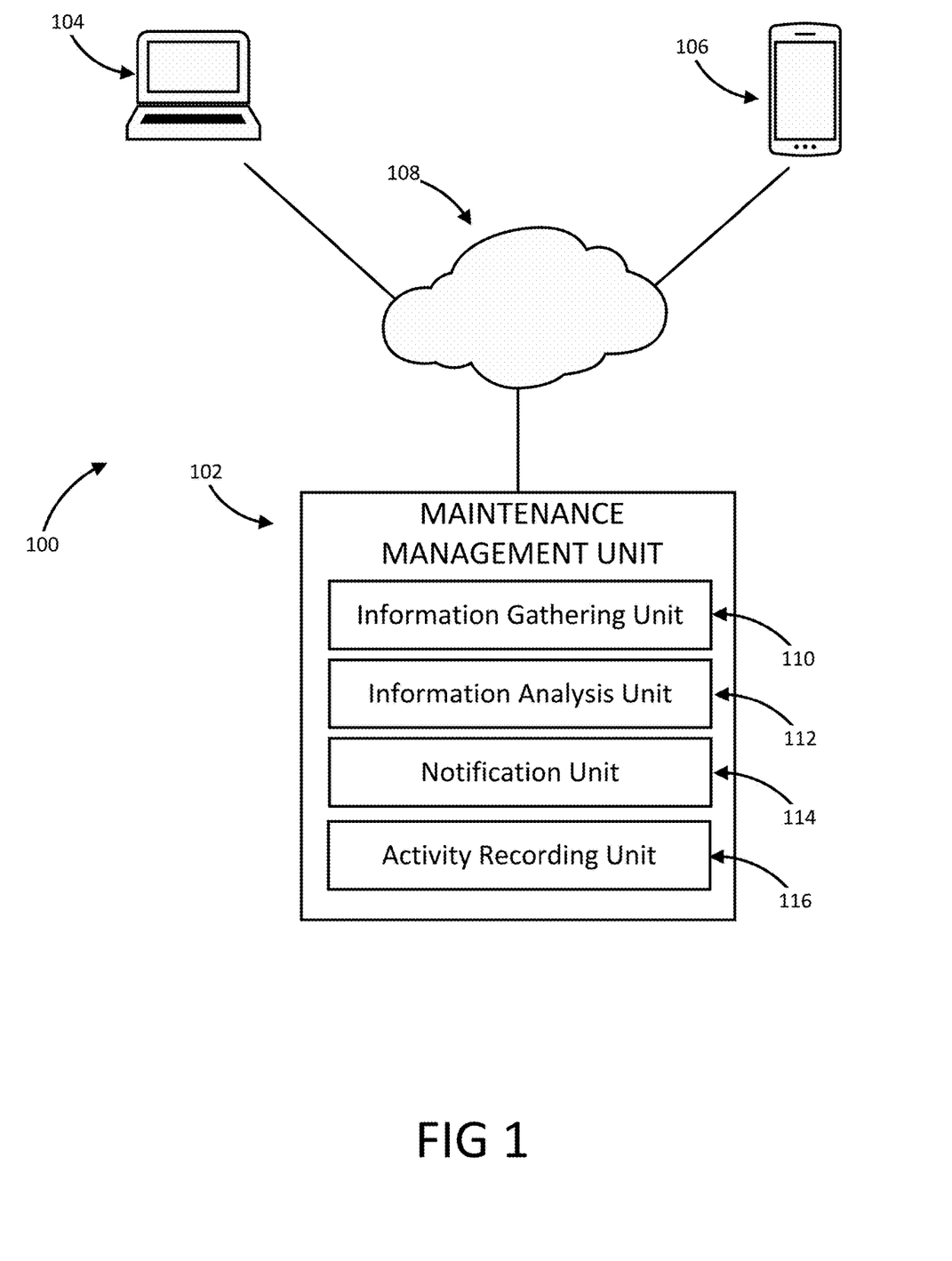
FIG. 1 depicts one embodiment of a maintenance management system consistent with the present invention.

FIG. 1 depicts one embodiment of a maintenance management system 100 consistent with the present invention. The maintenance management system 100 includes a maintenance management unit 102, a communication device 1 104, a communication device 2 106 each communicatively connected via a network 108. The maintenance management unit 102 further includes an information gathering unit 110, an information analysis unit 112, a notification unit 114 and a activity recording unit 116.

The information gathering unit 110 and information analysis unit 112 may be embodied by one or more servers. Alternatively, each of the notification unit 114 and activity recording unit 116 may be implemented using any combination of hardware and software, whether as incorporated in a single device or as a functionally distributed across multiple platforms and devices.

In one embodiment, the network 108 is a cellular network, a TCP/IP network, or any other suitable network topology. In another embodiment, the maintenance management unit 102 may incorporate servers, workstations, network appliances or any other suitable data storage devices. In another embodiment, the communication devices 104 and 106 may be any combination of cellular phones, telephones, personal data assistants, or any other suitable communication devices. In one embodiment, the network 108 may be any private or public communication network known to one skilled in the art such as a local area network ("LAN"), wide area network ("WAN"), peer-to-peer network, cellular network, or any suitable network, using standard communication protocols. The network 108 may include hardwired as well as wireless branches.

Figure 2A:
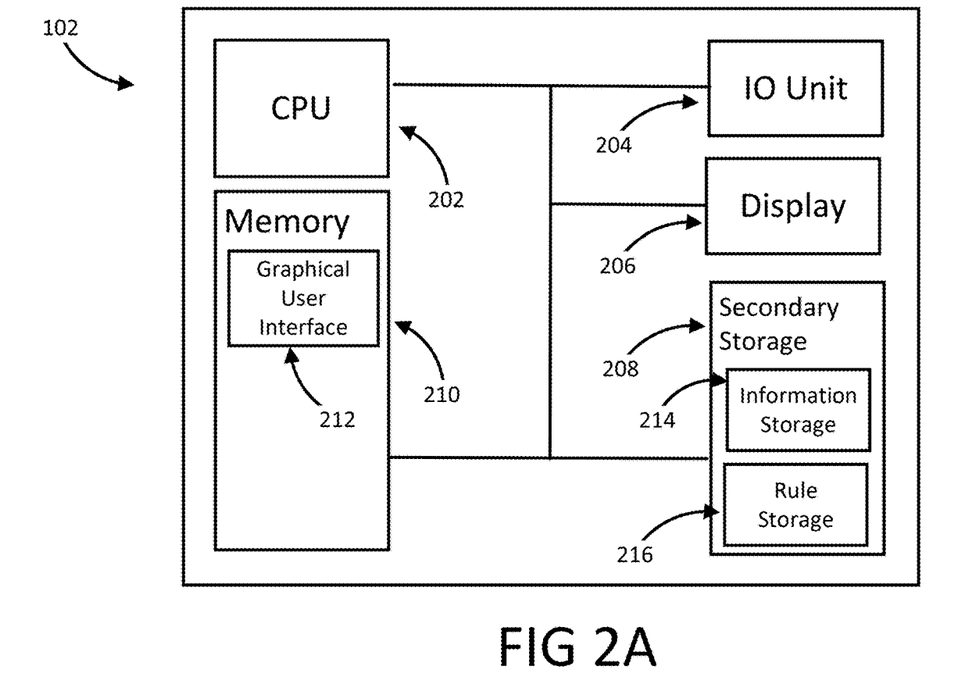
FIG. 2A depicts one embodiment of a maintenance management unit.

FIG. 2A depicts one embodiment of a maintenance management unit 102. The maintenance management unit 102 includes a network I/O device 204, a processor 202, a display 206 and a secondary storage 208 running image storage unit 210 and a memory 212 running a graphical user interface 214. In one embodiment, the processor 202 may be a central processing unit ("CPU"), an application specific integrated circuit ("ASIC"), a microprocessor or any other suitable processing device. The memory 212 may include a hard disk, random access memory, cache, removable media drive, mass storage or configuration suitable as storage for data, instructions, and information. In one embodiment, the memory 208 and processor 202 may be integrated. The memory 210 may use any type of volatile or non-volatile storage techniques and mediums. The network I/O line 204 device may be a network interface card, a cellular interface card, a plain old telephone service ("POTS") interface card, an ASCII interface card, or any other suitable network interface device.

Figure 2B:
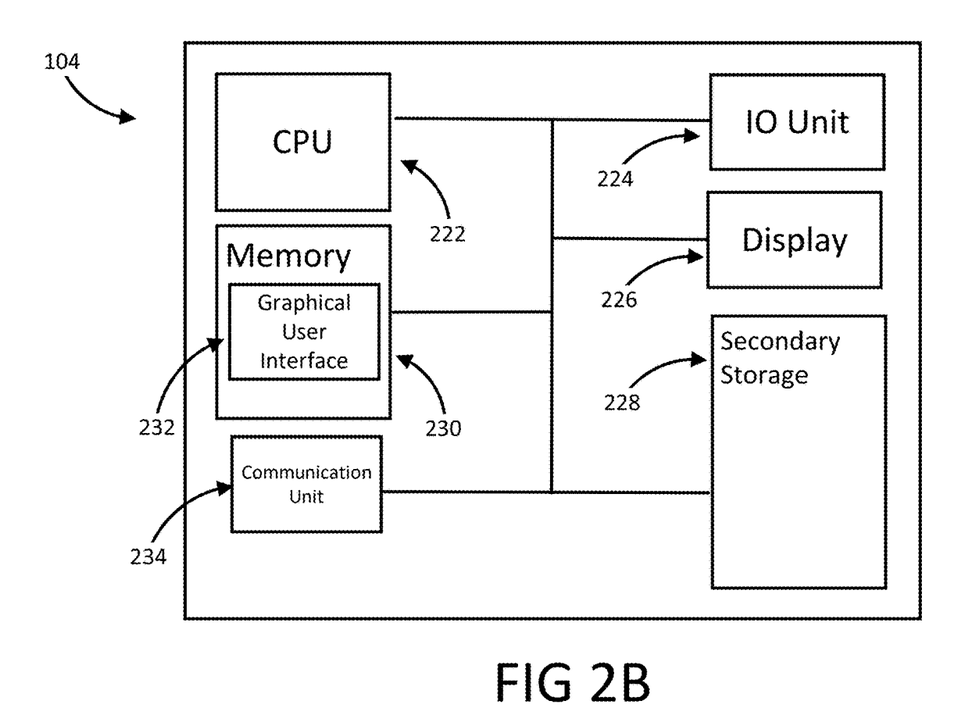
FIG. 2B depicts one embodiment of a communication device consistent with the present invention.

FIG. 2B depicts one embodiment of a communication device 104/106 consistent with the present invention. The communication device 104/1106 includes a processor 222, a network I/O Unit 224, a display unit 226, a secondary storage unit 228, and memory 230 running a graphical user interface 232 and a communication unit 234. In one embodiment, the processor 222 may be a central processing unit ("CPU"), an application specific integrated circuit ("ASIC"), a microprocessor or any other suitable processing device. The memory 230 may include a hard disk, random access memory, cache, removable media drive, mass storage or configuration suitable as storage for data, instructions, and information. In one embodiment, the memory 230 and processor 222 may be integrated. The memory 230 may use any type of volatile or non-volatile storage techniques and mediums. The network I/O device 224 may be a network interface card, a plain old telephone service ("POTS") interface card, an ASCII interface card, or any other suitable network interface device.

Figure 3:
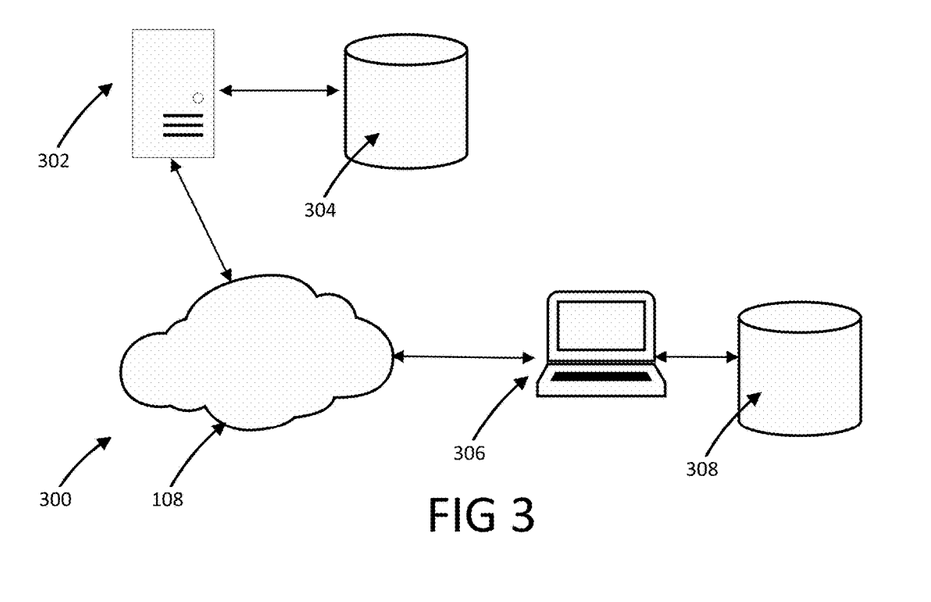
FIG. 3 depicts a schematic representation of the data storage layout of the maintenance management system.

FIG. 3 depicts a schematic representation of the data storage layout of the maintenance management system 100. A main server 302 includes a main database 304 operating in the memory 202 of the main server. The main server 302 communicates over the network 108 with a remote workstation 306 that includes a local database 308. The remote workstation 306 stores information in the local database 308. The remote workstation 306 may also request information from the main server 302 main database 304 for storage in the remote database 308. The main server 302 stores information from all remote workstations connected to the network 108. The main database 304 storges the information from all remote databases 308 and consolidates the information for analysis.

Figure 4:
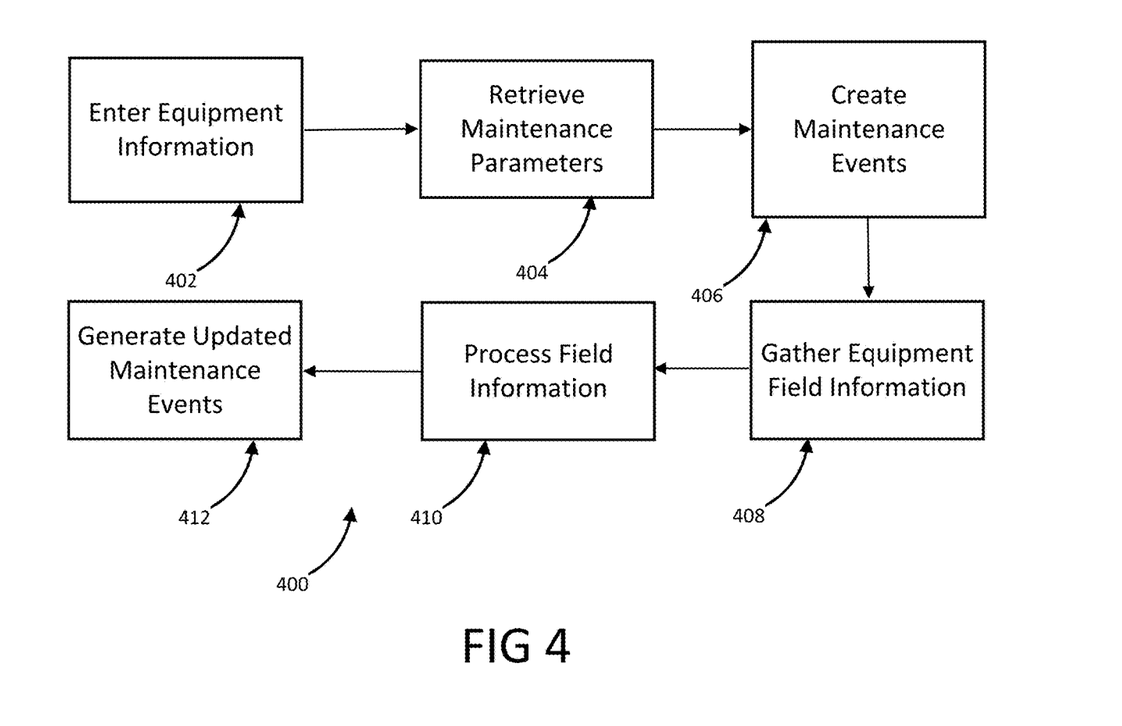
FIG. 4 depicts a schematic representation of the operation of the maintenance management system.

FIG. 4 depicts a schematic representation of the operation of the maintenance management system 100. In step 402, equipment information is entered into the remote database 308. The equipment information may include model numbers, manufacturer information, the physical location of the equipment, the user manuals for the equipment, equipment pictures or any other information related to the equipment.

In step 404, the maintenance parameters for the entered equipment are retrieved from the main database 304 or from the manufacturer via the information gathering unit 112. The information may include the time between required maintenance, the tasks to complete for each maintenance routine and any other maintenance information. In one embodiment, the main server 302 is in communication with a plurality of servers storing manufacturer maintenance information on equipment and the main server 302 may update the maintenance tasks based on information provided by the manufacturer's servers. As an illustrative example, a manufacturer may provide information on maintenance of a piece of equipment including software updates, maintenance notifications, recalls, repair bulletins or any other equipment related information. The main server 302 may retrieve maintenance information from the manufacturer servers and update the maintenance tasks and checklists based on the retrieved information. The main server 302 may update the remote databases 308 that are connected to the equipment related to the newly retrieved information.

In step 406, the information analysis unit 114 creates a series of maintenance tasks based on the maintenance information. The maintenance tasks may include the date to perform a maintenance task, the maintenance task to perform, and other parameters related to a maintenance task. In step 408, information related to the equipment is gathered at the location of the equipment when maintenance is being performed. The field information may include measurements taken of environmental variables related to the measurements or conditions monitored by the equipment. The field information may also include visual observations related to equipment and the condition of the environment surrounding the equipment.

In step 410, the field information is compared to a value retrieved from the remote database 308 for the given parameter. If the comparison of the measured value differs from the field information stored in the remote database 308 or main database 304, the remote workstation 306 and the server 302 will initiate an alarm notifying personnel of the deviation. In another embodiment, the remote workstation 306 may alert a user of the deviation and present possible solutions to the user. In another embodiment, the information analysis unit 114 may provide a listing of similar issues for the same model of equipment and the associated solution to the issue to assist in resolving the issue. Once the issue is resolved, the user may enter in the resolution that corrected the issue.

In step 412, a new maintenance event may be scheduled based on the outcome of the previous maintenance event. As an illustrative example, if a field measurement is compared to a stored value and the field measurement deviates from the stored value, a new maintenance event may be generated to perform a follow up field measurement at a later date to confirm proper operation of the equipment.

Figure 5:
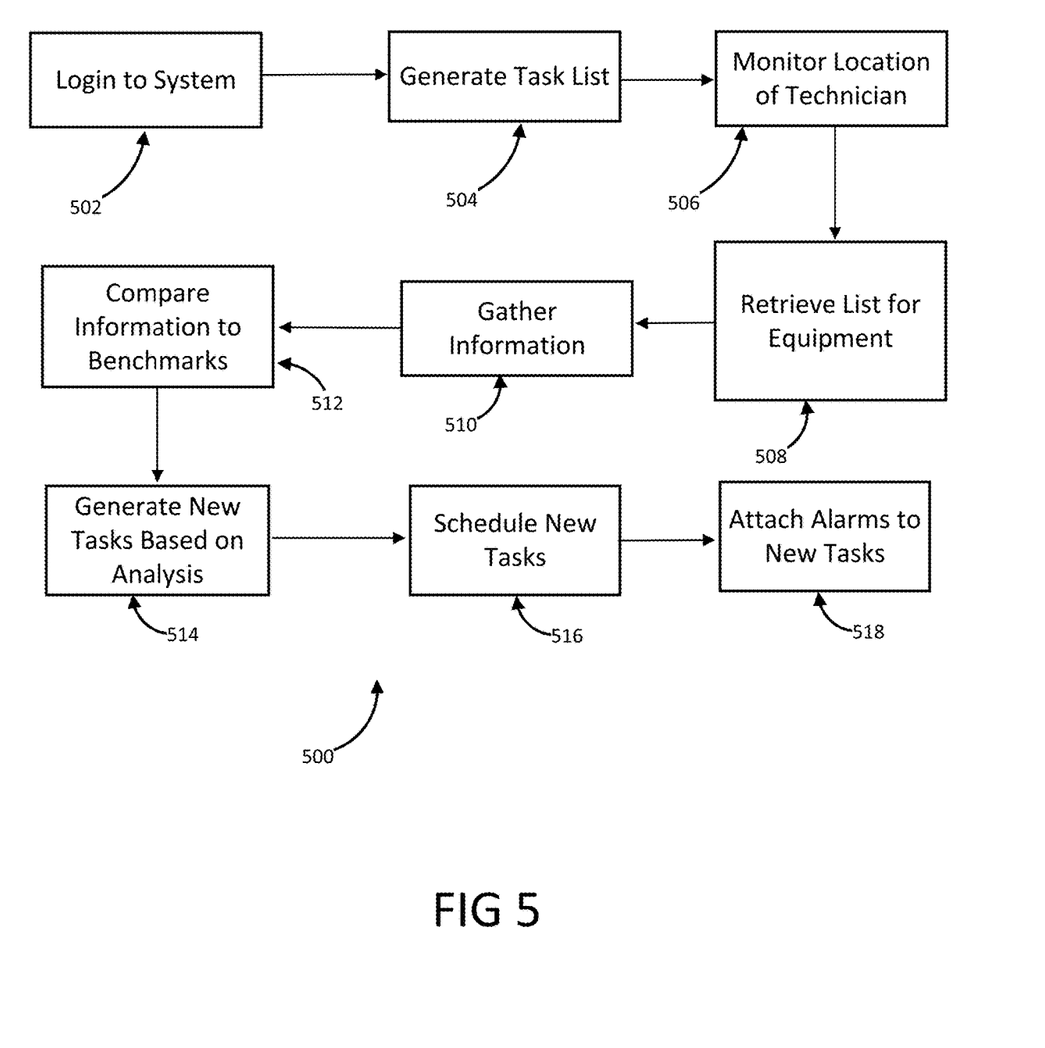
FIG. 5 depicts a schematic representation of a process to perform and track maintenance on a piece of equipment.

FIG. 5 depicts a schematic representation of a process to perform and track maintenance on a piece of equipment. In step 502, a user logs into the system. The user login may restrict what information is viewed by the user. As an illustrative example, a technician may have access to different information than a higher level user such as an administrator. In step 504, a task list is generated. The generation of the task list may be based on any combination of the location of the equipment, the type of equipment, the predefined maintenance tasks to be completed or any other characteristic of the equipment or facility. In step 506, the location of the service technician is tracked using any known method of tracking including using a GPS location device such as a mobile phone, tablet or computer. In step 508, when the technician reaches the location of the equipment, the task list for the equipment is retrieved from the main database 304 or the remote database 308. The task list may be displayed via software running on a mobile device or laptop computer. Documents and videos may be associated with each task to assist the technician in performing the task. As an illustrative example, if a task involves calibrating a part of the equipment, a link on the remote workstation or technical tablet may display a video demonstrating how to perform the calibration. In addition, a link to the operation manual for the equipment may also be associated with the task and provided as a link. In step 510, information related to the equipment is gathered and entered into the remote database 308. The information may include information the technician gathers based on the task list. In one embodiment, the mobile device wirelessly, or via a wired connection, connects to the equipment to download information from the equipment. In another embodiment, the technician inputs notes on the condition of the equipment which is then stored in the remote database 308.

In step 512, the main server 302 or remote workstation 306 compares the gathered information to benchmark values stored in the main database 304 or remote database 308. During this step, the technician checks off the completed tasks as they are performed and the remote workstation marks the tasks as completed in the remote database 308, which then updates the main database 304. In step 514, the remote workstation 306 generates new tasks based on the information gathered from the equipment. The new tasks may be new maintenance tasks that are generated as a result of the comparison of the gathered data to the retrieved benchmarks. The new tasks may also be scheduled maintenance tasks that are triggered by the completion of the prior tasks on the equipment. In step 516, the new tasks are scheduled for completion. The tasks may be scheduled based on predefined time frames for maintenance that are stored in the main database 304 or remote database 306. The schedules may be adjusted based on the availability of technicians around the predetermined time for maintenance including considering weekends, holidays, and facility closures. In step 518, alarm notifications are attached to the new tasks. Alarm notifications may include, but are not limited to, benchmark values for characteristics of the equipment, reminder notifications for future maintenance or any other notification related to the equipment.

Figure 6:
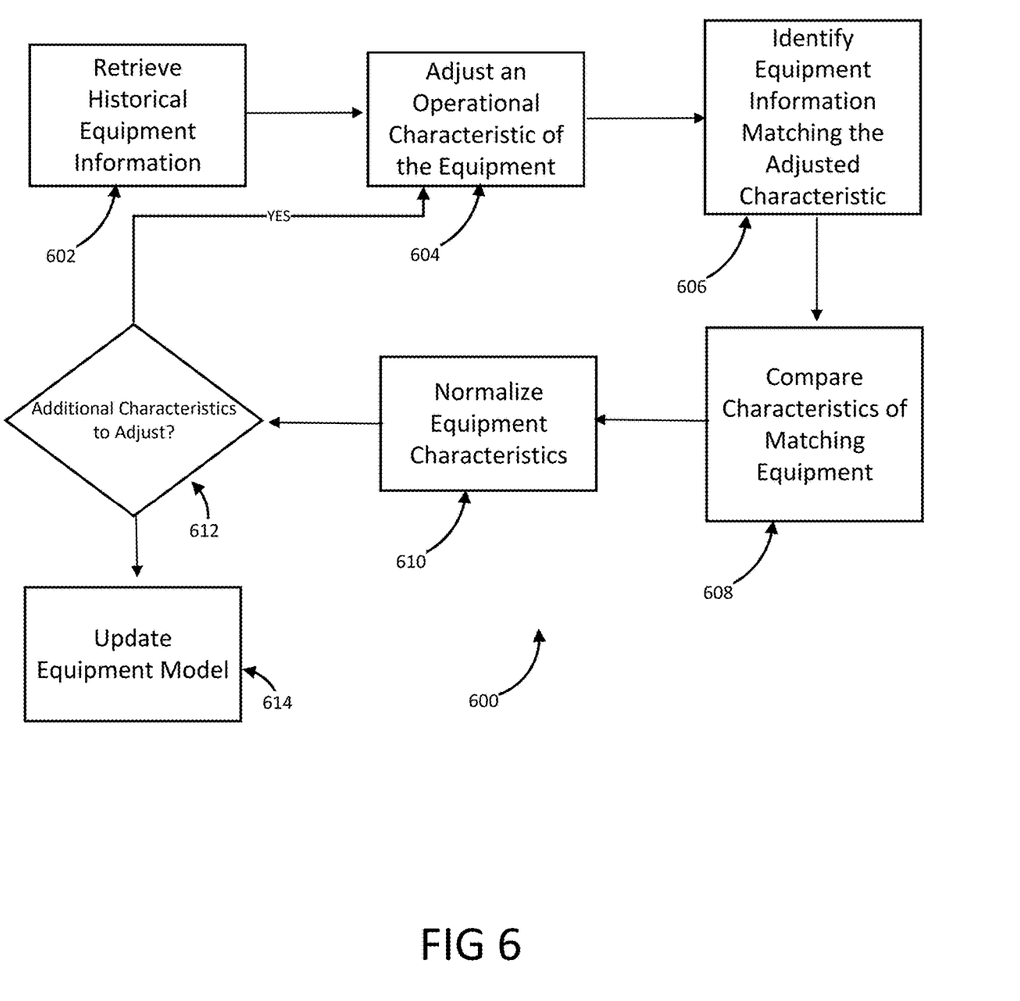
FIG. 6 depicts a schematic representation of a process of automatically generating a digital twin model of a piece of equipment.

FIG. 6 depicts a schematic representation of a process of automatically generating a digital twin model of a piece of equipment. In step 602, historical information is retrieved from the main database 304. The historical information represents all the information gathered on all equipment from the same manufacture with the same model number over a period of time with the information being updated each time the model is maintained at any location. In step 604, the main server 302 adjusts one operation characteristic of the equipment. The adjusted characteristic may be any characteristic of the equipment and the value the characteristic is adjusted to may be a single value or may be adjusted every time the characteristic is selected for adjustment until the span of the possible values for the characteristic have been exhausted. In step 606, the main server 306 identifies historical instances where the adjusted value matches the actual value measured in the equipment. The identified values are marked as being similar in the main database. In step 608, the main sever 302 compares the unadjusted characteristics from each of the identified equipment and stores the information in memory. In step 610, the main server 302 normalizes all the unadjusted characteristics. The normalization algorithm may be a z-scaling normalization algorithm, a min-max normalization algorithm or any other normalization algorithm. In step 612, the main server 302 determines if all possible values of the adjusted characteristic have been adjusted and analyzed or if all characteristics have been analyzed across all possible value ranges. If additional characteristics or characteristic values require analysis, the main server 302 performs an adjustment and returns to step 604. If no additional characteristics or characteristic values require adjustment, the main server 302 updates the equipment model.

The process in FIG. 6 may be performed continuously or after maintenance has been performed on a specific model of equipment. After the analysis, a digital twin of the equipment is created. The digital twin allows for the main server 302 to accurately predict equipment malfunctions and maintenance events. The main server 302 may input current characteristics into the digital twin and receive a listing of potential failures for the equipment and the preventative maintenance tasks to perform to avoid the failure. In one embodiment, repair and replacement costs are associated with characteristics of the equipment to accurately predict the repair and replacement costs for a specific piece of equipment.

Figure 7:
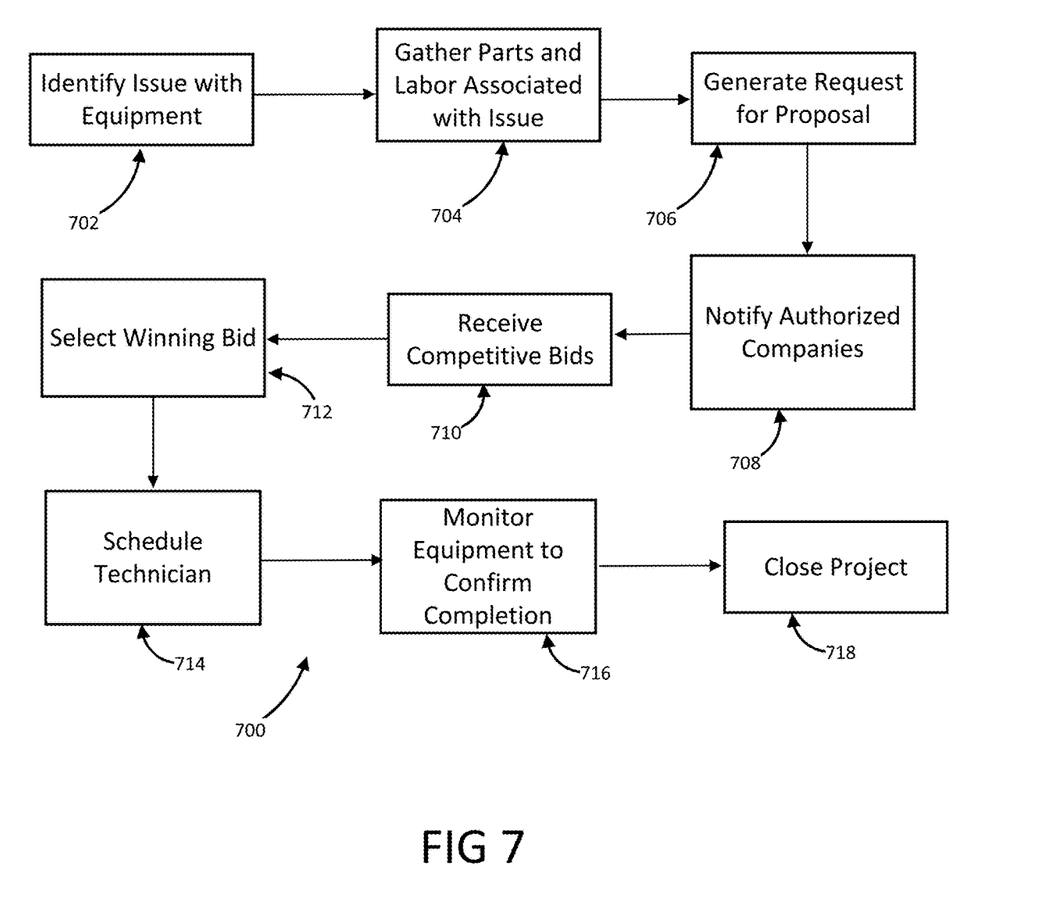
FIG. 7 depicts a schematic representation of a process to identify equipment issues and schedule a resolution.

FIG. 7 depicts a schematic representation of a process to identify equipment issues and schedule a resolution. In step 702, a technician or monitoring software identifies an issue with a piece of equipment. In step 704, the main server 302 receives the issue with the piece of equipment and generates a list of parts and associated labor by querying the main database 304 and retrieving parts and labor costs for the same or similar issue with the same or similar equipment. In step 706, the main server 302 generates a request for proposal using the information retrieved from the main database 304. In step 708, the main server 302 notifies companies authorized to repair the equipment to provide pricing to repair the issue. In step 710, the main server 302 receives bid packages from authorized companies. In step 712, the mains server displays the various bid packages to a user and the user selects the company to perform the repair. In step 714, the main server 302 schedules to repair of the equipment with the winning company. In step 716, the remote workstation 306 monitors the equipment to confirm the repair was completed. In step 718, the main server 302 via the remote workstation 306, marks the project as being completed.

Figure 8:
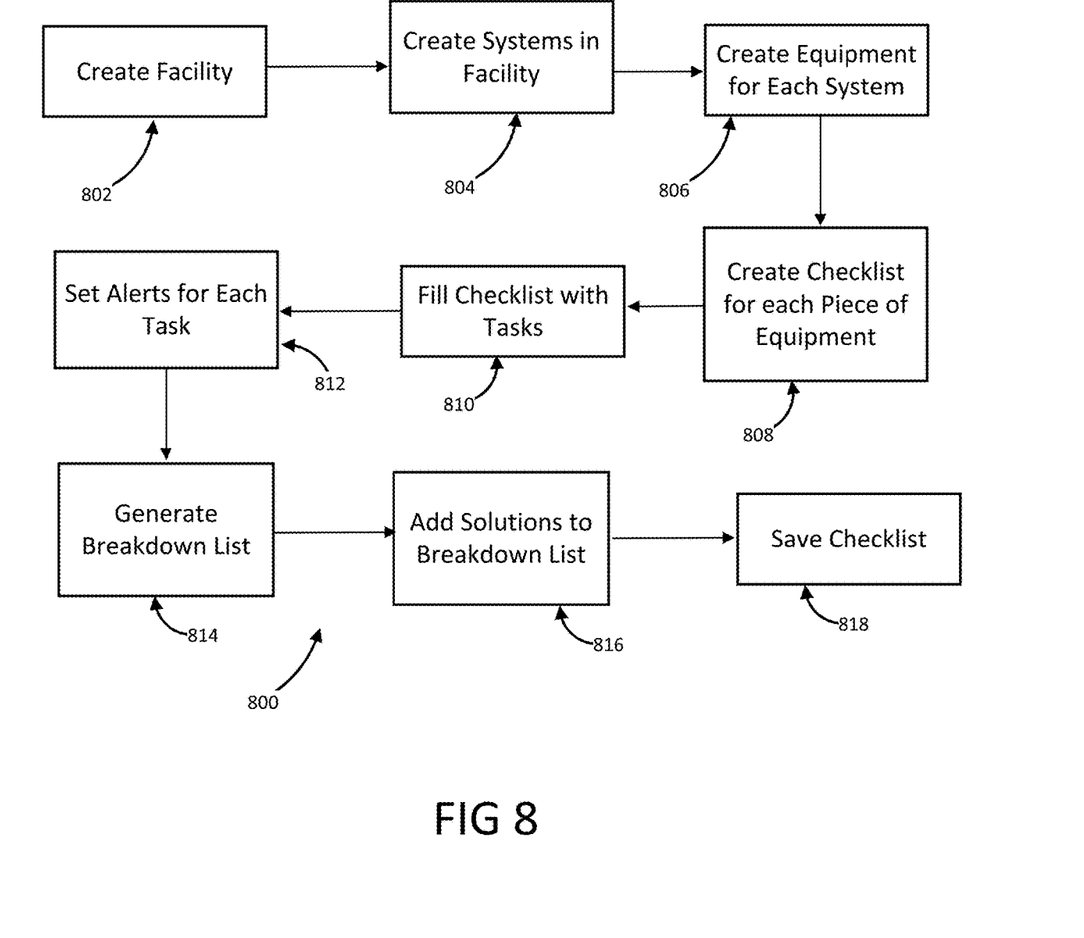
FIG. 8 depicts a schematic representation of a process of creating a piece of equipment and associated systems.

FIG. 8 depicts a schematic representation of a process of creating a piece of equipment and associated systems. In step 802, a facility is created. A facility represents the physical location where the equipment will reside. The facility can be a single building or a campus with multiple buildings. In one embodiment, the facility includes links to different building locations. In step 804, the systems resident in the facility are created. The systems represent physical and logical connections between operating equipment in the facility or a building in the facility. As an illustrative example, a cooling system may have a chiller connected to a piping system and power circuit with the piping system connecting to pumps and cooling coils throughout the facility. In this example, all the components connected to the chiller represent the cooling system. In step 806, the equipment connected to each system are created and linked to the each other through the system. In one embodiment, a piece of equipment can be connected to more than one system.

In step 808, checklists are created for maintenance that is performed on each piece of equipment in the system. In step 810, tasks are associated with each checklist. Each checklist represents the actions that will be performed on a piece of equipment or the system. A technician performing the maintenance on the equipment or system will mark each task as complete as the task is performed. A single piece of equipment may have multiple checklists and associated tasks. In one embodiment, each checklist includes gathering information from the equipment and entering values for the information into the checklist. As an illustrative example, if a piece of equipment includes a motor, the technician may measure the amperage drawn from the motor and enter the measured value into the checklist.

In step 812, alerts are set for each task. Each alert notifies the remote workstation of an event that is occurring or will occur in the near future. As an illustrative example, an upcoming maintenance event may be an alert that notifies the remote workstation 306 one week before the event occurs. In another illustrative example, an alert may occur when a measured value is outside a desired range. In step 814, a breakdown list is generated for each piece of equipment. A breakdown list represents the potential operational issues that may occur for a piece of equipment. The breakdown list is generated from historical issues that have occurred with a piece of equipment or from troubleshooting manuals and bulletins from the equipment manufacturer. In step 816, solutions to potential breakdowns are associated with each breakdown item in the breakdown list. The solutions are generated from prior breakdowns and the resulting tasks performed to fix the breakdown and from manufacturer equipment manuals and bulletins. Documents and videos may be associated with each breakdown to allow a technician to obtain more detail on how the breakdown can be corrected. In one embodiment, videos of a technician correcting are breakdown are associated with the breakdown and made available for technicians to play during the repair of the breakdown. In another embodiment, the breakdown task may include components of the associated systems to check to determine the cause of the breakdown. As an illustrative example, a warm cooling coil may require checking the main chiller and associated pumps as part of the troubleshooting process.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed:

1. A maintenance management system comprising:
   a server on which a first database operates;
   a remote device on which a second database operates, wherein the remote device is in communication with the first database;
   a scheduling unit for generating a maintenance schedule and scheduling maintenance;
   a task unit for listing maintenance tasks to perform on at least one monitoring device,
   wherein:
      the maintenance schedule and the maintenance tasks are respectively stored in the first database and the second database, and
      historical information of the least one monitoring device is stored in the first database, the historical information being gathered from a plurality of facilities in communication with the first database.

2. The maintenance management system of claim 1, wherein the remote device requests the historical information from the first database to resolve an issue with the at least one monitoring device.

3. The maintenance management system of claim 2, wherein the remote device distributes a description of the issue with the at least one monitoring device to at least one maintenance vendor.

4. The maintenance management system of claim 3, wherein the at least one maintenance vendor provides a cost estimate to repair the issue with the at least one monitoring device.

5. The maintenance management system of claim 4, wherein:
   the remote device selects and schedules a maintenance vendor of the at least one maintenance vendor to complete a repair on the monitoring device, and
   the selected maintenance vendor is the maintenance vendor of the at least one maintenance vendor who submitted the lowest cost estimate to repair the issue with the at least one monitoring device.

6. The maintenance management system of claim 5, wherein the remote device monitors a status of the monitoring device to determine a progress of the repair on the monitoring device.

7. The maintenance management system of claim 1, wherein each monitoring device of the at least one monitoring device is associated with a facility.

8. A method of tracking maintenance on at least one monitoring device, the method comprising:
   operating a first database on a server;

operating a second database on a remote device with the remote device in communication with the first database;

scheduling maintenance via a scheduling unit which generates a maintenance schedule;

listing maintenance tasks to perform on the at least one monitoring device, wherein:

the maintenance schedule and the maintenance tasks are respectively stored in the first database and the second database, and historical information of the least one monitoring device is stored in the first database, the historical information being gathered from a plurality of facilities in communication with the first database.

9. The method of claim 8, further comprising requesting the historical information, via the remote device, from the first database to resolve an issue with the at least one monitoring device.

10. The method of claim 9, further comprising distributing a description of the issue with the at least one monitoring device to at least one maintenance vendor.

11. The method of claim 10, wherein the at least one maintenance vendor provides a cost estimate to repair the issue with the at least one monitoring device.

12. The method of claim 11, further comprising:

selecting, via the remote device, and scheduling a maintenance vendor of the at least one maintenance vendor to complete a repair on the monitoring device, wherein the selected maintenance vendor is the maintenance vendor of the at least one maintenance vendor who submitted the lowest cost estimate to repair the issue with the at least one monitoring device.

13. The method of claim 12, further comprising monitoring the status of the monitoring device to determine a progress of the repair on the monitoring device.

14. The method of claim 8, wherein each monitoring device of the at least one monitoring device is associated with a facility.

* * * * *